United States Patent [19]

Mayuzumi et al.

[11] 3,837,876

[45] Sept. 24, 1974

[54] ORGANOSILICONE COMPOSITIONS

[75] Inventors: Tetsuya Mayuzumi; Yoshio Inoue, both of Annaka, Japan

[73] Assignee: Shinetsu Chemical Company, Tokyo, Japan

[22] Filed: Jan. 15, 1973

[21] Appl. No.: 323,340

[30] Foreign Application Priority Data
Jan. 13, 1972 Japan............................. 47-475997

[52] U.S. Cl.... 106/287 SB, 117/124 D, 117/132 R, 117/132 BS, 117/132 BE, 117/135.1, 260/46.5 E, 260/448.2 N
[51] Int. Cl............................................ C07g 17/00
[58] Field of Search........ 106/287 SB; 260/448.2 N, 260/46.5 E

[56] References Cited
UNITED STATES PATENTS
3,299,166   1/1967   Emblem et al............... 260/448.2 N Primary Examiner—Melvyn I. Marquis
Attorney, Agent, or Firm—Toren, McGeady and Stanger

[57] ABSTRACT

Organosilicone compositions which consist essentially of the product of the reaction of a mixture of a certain aminoalkylalkoxysilane and a certain epoxyalkylalkoxysilane. The organosilicone compositions are used in the form of a blend with a sealant or a primer coating for improving the adhesion of such blends onto various surfaces, or the adhesion of the sealant itself onto the various surfaces, respectively.

5 Claims, No Drawings

ORGANOSILICONE COMPOSITIONS

SUMMARY OF THE INVENTION

This invention relates to novel organosilicone compositions useful in the improvement of adhesion of a variety of setting compositions such as sealants onto various substrates.

The known setting compositions are silicone resin, polyurethane, phenol resin, polyester, epoxy resin, polysulfide, and the like and have hitherto been widely utilized as filling or sealing materials. However, since these materials have insufficient adhesive or fixing properties for metallic or glassy surfaces, those surfaces have usually been treated with a preliminary primer coating, that is a relatively simple process for the improvement of adhesion of the adhesive materials.

The primers hitherto used are known carbon-functional silanes, such as, aminoalkylsilanes having functional groups with which a component of the setting composition may react. However, such primers do not work satisfactorily when applied to surfaces having moisture thereon, for the presence of moisture will cause the adhesive strength of the primers to gradually weaken and to occasionally separate from the substrate.

It is an object of the invention to provide organosilicone compositions which are free of the defects described above and generally applicable for the various setting compositions. The organosilicone compositions should consist essentially of the product of the reaction of a mixture of (1) aminoalkylalkoxysilanes represented by the general formula

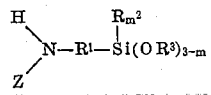

wherein $R^1$ is a divalent hydrocarbon radical containing one to four carbon atoms, $R^2$ and $R^3$ are monovalent hydrocarbon radicals containing one to four carbon atoms, Z is hydrogen or an aminoalkyl radical, and m is 0 or 1 and (2) epoxyalkylalkoxysilanes represented by the general formula

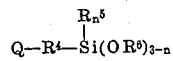

wherein $R^4$ is a divalent hydrocarbon radical containing one to four carbon atoms, $R^5$ and $R^6$ are monovalent hydrocarbon radicals containing one to four carbon atoms, Q is a glycidoxy or epoxycyclohexyl radical, and n is 0 or 1.

The present invention is based on the inventors' recognition that the organosilicone compositions are capable of affording remarkably excellent adhesive or fixing effects to setting composition of silicone resin, polyurethane, phenol resin, polyester, epoxy resin, polysulfide or the like applied onto various surfaces and that such excellent effects are attained even in the presence of moisture at the surface where the setting composition is applied.

The aminoalkylalkoxysilanes used in the invention are exemplified by aminomethyltriethoxysilane, N-(β-aminoethyl)aminomethyltrimethoxysilane, aminomethylmethyl diethoxysilane, N-(β-aminoethyl)methyltriethoxysilane, γ-aminopropyltriethoxysilane, γ-aminopropylmethyldiethoxysilane, γ-aminoisobutyltrimethoxysilane, N-(β-aminoethyl)-γ-aminopropyltrimethoxysilane, and N-(β-aminoethyl)-γ-aminopropylmethyldimethoxysilane.

The epoxyalkylalkoxysilanes are exemplified by γ-glycidoxypropyltrimethoxysilane, γ-glycidoxypropylmethyldimethoxysilane, 3,4-epoxycyclohexylethyltrimethoxysilane, and 3,4-epoxycyclohexylethylmethyldimethoxysilane.

The organosilicone compositions according to the present invention should be obtained by reacting the aminoalkylalkoxysilane with the epoxyalkylalkoxysilane with stirring at an elevated temperature of from 50° to 150°C, preferably from 80° to 100°C for a period of from 1 to 7 hours, preferably from 3 to 5 hours. The reaction product or the organosilicone composition may contain some unreacted substances. With reference to the ratio of the aminoalkylalkoxysilane with the epoxyalkylalkoxysilane used in the reaction, it may be from about 1:0.5 to 1:2.0 mole, preferably 1:0.75 to 1:1.5 mole. If the latter is used in an amount not exceeding about 0.5 mole to 1 mole of the former, the principal object of the present invention, that is, to obtain strong and improved adhesion even at a surface where moisture is present, is difficult to attain. On the other hand, if the amount of the latter exceeds about 2.0 moles, the reaction system will be gelled during the course of the reaction.

Next, preferable procedures of application of the organosilicone compositions according to the present invention will follow.

An amount up to 5 percent by weight, preferably from 0.5 to 1.5 percent by weight, of the organosilicone composition is either blended directly with a setting compositions of, for instance, polysulfide, urethane, epoxy or silicone resin, or dissolved in an organic solvent to produce a liquid having a concentration not exceeding about 30 percent by weight. Such blends or liquids may be applied over the surfaces of various substrates, including metals, glass, stones, enamelled materials, wood, papers, and plastics. In the case of the liquid that is used as primer coating, a setting composition will be applied thereon.

The organic solvents employed are not particularly limited but may be one or more selected from the group consisting of alcohols, such as, ethanol, isopropanol and 2-methoxymethanol, esters, such as, ethylacetate, ketones, such as, ethylmethylketone, and aromatics, such as, toluene and xylene.

The following examples are given for purposes of illustration to aid in understanding the invention and it is understood that the invention is not limited to the specific materials or operating conditions disclosed.

EXAMPLE 1.

Into a 1-litre separable flask equipped with a condenser, a thermometer and an agitator, 222 g (1 mole) of N-(β-aminoethyl)-γ-aminopropyltrimethyoxysilane and 236 g (1 mole) of γ-glycidoxypropyltrimethoxysilane were charged. The mixture was gradually heated to a temperature in the range of from 80° to 100°C, while being stirred to react for 3 hours. The resulting product of reaction had a viscosity of 238 cs (at 25°), an index of refraction of 1.4534 and a specific gravity of 1.085.

This product (the organosilicone composition of the invention) was subjected to an infrared absorption spectrum analysis to find that the reaction occurred between the amino and epoxy groups.

Then, 1 percent by weight of the same product was added to a polysulfide sealant (Thiokol, produced by Thiokol, Inc. and in Japan by ABC Company) and the blend (the sealant composition) was applied and set over the surfaces of glass and aluminium plates.

These glass and aluminum plates were treated by (a) allowing them to stand for 7 days, (b) immersing them in water at 25°C for 96 hours after having been allowed to stand for 7 days, or (c) heating at 70°C for 96 hours after having been allowed to stand for 7 days. Thereupon, the sealant composition applied on each glass or aluminum plate was subjected to an adhesion test with respect to adhesive strength in accordance with Japanese Industrial Standard, JIS A–5754. The following tables show the results of the test.

Table 1

| | (Glass plate) Amount of the reaction product | Adhesive strength (kg/cm²) By treatment (a) | By treatment (b) | By treatment (c) |
|---|---|---|---|---|
| Present invention | 1% by weight | 11.2 | 10.9 | Sealant composition fractured |
| Comparative example | None | 3.0 | 6.5 | Sealant composition peeled |

Table 2

| | (Aluminum plate) Amount of the reaction product | Adhesive strength (kg/cm²) By treatment (a) | By treatment (b) | By treatment (c) |
|---|---|---|---|---|
| Present invention | 1% by weight | 11.0 | 12.9 | Sealant fractured |
| Comparative example | None | 3.2 | 5.0 | Sealant peeled |

EXAMPLE 2

Sample primers 1 – 6 were prepared in the following manners.

Primer 1:
The reaction product of Example 1 was dissolved in toluene (10 percent by weight) to obtain Primer 1.

Primer 2:
Into a container similar to that used in Example 1, 221 g (1 mole) of γ-aminopropyltriethyoxysilane and 236 g (1 mole) of γ-glycidoxypropyltrimethoxysilane were charged. The mixture was gradually heated to a temperature in the range of from 80° to 100°C, while being stirred, to react for 3 hours. The resulting product of reaction had a viscosity of 57 cs and an index of refraction of 1.4449. This product was dissolved in toluene (10 percent by weight) to obtain Primer 2.

Primer 3:
Into a container similar to that used in Example 1, 222 g (1 mole) of N-(β-aminoethyl)-γ-aminopropyltrimethoxysilane and 472 g (1 mole) of γ-glycidoxypropyltrimethoxysilane were charged. The mixture was gradually heated to a temperature in the range of from 80° to 100°C, while being stirred, to react for 2 hours. The resulting product of reaction had a viscosity of 3,270 cs and an index of refraction of 1.4420. This product was dissolved in toluene (10 percent by weight) to obtain Primer 3.

Primer 4:
γ-Glycidoxypropyltrimethoxysilane was dissolved in ethanol (10 percent by weight) to obtain Primer 4.

Primer 5:
N-(β-aminoehtyl)-γ-aminopropyltrimethoxysilane was dissolved in ethanol (10% by weight) to obtain Primer 5.

Primer 6:
γ-Aminopropyltrietoxysilane was dissolved in ethanol (10 percent by weight) to obtain Primer 6.

The above primers 1 – 6 were applied over the surfaces of glass and aluminum plates and a polyurethane sealant (Takenate L–1025, product by Takeda Pharmaceutical Industry Co., Ltd.) was placed thereon.

These glass and aluminum plates were treated by (a) allowing them to stand for 7 days, (b) immersing them in water at 25°C for 96 hours after having been allowed to stand for 7 days, or (c) heating at 70°C for 96 hours after having been allowed to stand for 7 days. Thereupon, the sealant set on each glass or aluminum plate was subjected to an adhesion test with respect to adhesive strength in accordance with Japanese Industrial Standard, JIS A–5754. The following tables show the results of the test.

Table 3

| | | (Glass plate) Adhesive strength (kg/cm²) | | |
|---|---|---|---|---|
| | Primer | By treatment (a) | By treatment (b) | By treatment (c) |
| Comparative example | No primer | 4.2 | 2.6 | 8.5 |
| Present Invention | 1 | 6.5 | 6.6 | 13.5 |
| do. | 2 | 5.7 | 6.0 | 12.1 |
| do. | 3 | 5.8 | 6.4 | 12.4 |
| Comparative example | 4 | 4.8 | 3.6 | 9.5 |
| do. | 5 | 5.4 | 4.1 | 9.7 |
| do. | 6 | 5.7 | 5.0 | 9.8 |

Table 4

| | | (Aluminum plate) Adhesive strength (kg/cm²) | | |
|---|---|---|---|---|
| | Primer | By treatment (a) | By treatment (b) | By treatment (c) |
| Comparative example | No primer | 2.6 | 2.3 | 5.7 |
| Present invention | 1 | 6.0 | 6.0 | 11.0 |
| do. | 2 | 6.6 | 8.6 | 11.2 |
| do. | 3 | 6.4 | 7.3 | 10.7 |
| Comparative example | 4 | 3.8 | 3.5 | 7.2 |
| do. | 5 | 5.9 | 3.4 | 8.7 |
| do. | 6 | 5.7 | 3.5 | 8.3 |

EXAMPLE 3

In this example, tests with the same materials and conditions as in Example 2 were repeated except that a polysulfide sealant (Thiokol, product by ABC Company in Japan) was used in lieu of the polyurethane sealant. The following tables show the results.

Table 5

| | | (Glass plate) Adhesive strength (kg/cm²) | | |
|---|---|---|---|---|
| | Primer | By Treatment (a) | By Treatment (b) | By Treatment (c) |
| Comparative example | No primer | 3.0 | 6.5 | Sealant peeled |
| Present invention | 1 | 8.6 | 8.3 | Sealant fractured |
| do. | 2 | 8.8 | 8.0 | do. |
| do. | 3 | 8.5 | 8.5 | do. |
| Comparative example | 4 | 4.7 | 3.7 | Sealant peeled |
| do. | 5 | 5.9 | 3.5 | do. |
| do. | 6 | 5.6 | 3.5 | do. |

Table 6

| | | (Aluminumm plate) Adhesive strength (kg/cm²) | | |
|---|---|---|---|---|
| | Primer | By Treatment (a) | By Treatment (b) | By Treatment (c) |
| Comparative example | No primer | 3.2 | 5.0 | Sealant peeled |
| Present invention | 1 | 8.0 | 10.7 | Sealant fractured |
| do. | 2 | 8.3 | 11.0 | do. |
| do. | 3 | 7.7 | 10.6 | do. |
| Comparative example | 4 | 4.0 | 3.5 | Sealant peeled |
| do. | 5 | 5.7 | 3.7 | do. |
| do. | 6 | 5.7 | 3.5 | do. |

EXAMPLE 4.

The above primers 1 and 2 were applied respectively over the surfaces of glass plates and thereon a polysulfide sealant (Quickly setting Thiokal, product by Thiokol Company in the U.S.A.) was placed and allowed to set. These glass plates were treated by (a) allowing them to stand for one day or (b) immersing them in water at room temperature for 15 days. Thereupon, the sealant set on each glass plate was subjected to peeling test (180° direction) in accordance with Japanese Industrial Standard, JIS A-5754. The results are shown in the following table.

Table 7

| | | Peel strength (kg/2.5cm) | |
|---|---|---|---|
| | Primer | By treatment (a) | By treatment (b) |
| Comparative example | No primer | 1.3 | 1.0 |
| Present invention | 1 | 16.0 | 14.8 |
| do. | 2 | 15.4 | 15.0 |

EXAMPLE 5.

The above primers 1 and 2 were applied respectively over the surfaces of glass plates and the same sealant as used in Example 4 was placed thereon and allowed to set. These sealant-coated glass plates were subjected to weathering test by means of a weather autometer (carbon electrodes) for individual periods of 100, 300 and 500 hours, and thereafter to the peeling test. The results are shown in the following table.

Table 8

| | | Peel strength (kg/2.5cm) | | |
|---|---|---|---|---|
| | Primer | After 100 hrs. | After 300 hrs. | After 500 hrs. |
| Comparative example | No primer | 0.5 | 0.5 | 0.5 |
| Present invention | 1 | 16.0 | 16.0 | 15.5 |
| do. | 2 | 15.8 | 17.0 | 15.4 |

EXAMPLE 6

The above primers 1 and 2 were applied respectively over the surface of the sheets of phenol resin, laminated epoxy resin, ABS resin, polycarbonate, and polyphenyleneoxide. Then, on each of these primer coated sheets, a polysulfide sealant (Fian Sealer, product by Nippon Additives Co., Ltd.) was placed and allowed to set. Thereupon, the sealant set on the various sheets was subjected to a shearing test, to find that each adhered surface remained unremoved, while the sealant itself was fractured.

EXAMPLE 7

The above primers 1, 2 and 3 were respectively applied over the surface of the metal plates of nickel, stainless, mild steel, aluminum and copper. Then, on each of these primer coatings, the same sealant as used in Example 6 was placed and allowed to set. Thereupon, a shear test similar to Example 6 was conducted, to find that each adhered surface remained unremoved, while the sealant itself was fractured.

EXAMPLE 8

The above primers 1, 2 and 3 were applied respectively over the surface of each plate of glass, aluminum, mild steel and iron. Then on each of these primer coated plates a silicone sealant (Shinetsu Silicone Sealant KE-42, product by Shinetsu Chemical Company) was applied and allowed to set. Thereupon a shear test similar to the preceding example was conducted, to find that the adhered surface remained unremoved, while the sealant itself was fractured.

EXAMPLE 9

The above primers 1, 2 and 3 were applied respectively over the surface of each sheet of phenol resin, epoxy resin and polycarbonate. Then, on each of these primer coated sheets, a silicone sealant (Shinetsu Silicone Sealant KE-42, product by Shinetsu Chemical Company) was applied and allowed to set. Thereupon, a shear test similar to the previous Example was carried out on each sample, to find that each adhered surface remained unremoved, while the sealant itself was fractured.

What is claimed is:

1. A primer for adhesion purposes, which comprises an organosilicone composition consisting essentially of the product of the reaction of
   a. is an aminoalkylalkoxysilane represented by the general formula

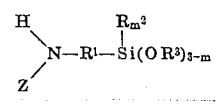

wherein $R^1$ is a divalent hydrocarbon radical having one to four carbon atoms, $R^2$ and $R^3$ are monovalent hydrocarbon radicals having one to four carbon atoms, Z is hydrogen or an aminoalkyl radical, and m is 0 or 1, with b. an epoxyalkylalkoxysilane represented by the general formula

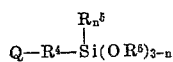

wherein $R^4$ is a divalent hydrocarbon radical having one to four carbon atoms, $R^5$ and $R^6$ are monovalent hydrocarbon radicals having one to four carbon atoms, Q is a glycidoxy or epoxycyclohexyl radical, and n is 0 or 1, at a temperature from 50° to 150°C, dissolved in an organic solvent in a concentration not exceeding 30 percent by weight.

2. The primer as claimed in claim 1, wherein said organic solvent is selected from the group consisting of alcohols, esters, ketones and aromatic hydrocarbons.

3. The organosilicone composition as claimed in claim 1, wherein said aminoalkylalkoxysilane is a member selected from the group consisting of aminomethyltriethoxysilane, N-(β-aminoethyl)aminomethyltrimethoxysilane, aminomethylmethyldiethoxysilane, N-(β-aminoethyl)methyltriethoxysilane, γ-aminopropyltriethoxysilane, γ-aminopropylmethyldiethoxysilane, γ-aminoisobutyltrimethoxysilane, N-(β-aminoethyl)-γ-aminopropyltrimethoxysilane, and N-(β-aminoethyl)-γ-aminopropylmethyldimethoxysilane.

4. The organosilicone composition as claimed in claim 1, wherein said epoxyalkylalkoxysilane is a member selected from the group consisting of γ-glycidoxypropyltrimethoxysilane, γ-glycidoxypropylmethyldimethoxysilane, 3,4-epoxycyclohexylethyltrimethoxysilane, and 3,4-epoxycyclophexylethylmethyldimethoxysilane.

5. The organosilicone composition as claimed in claim 1, wherein the reaction of said aminoalkylalkoxysilane and said epoxyalkylalkoxysilane is carried out in a molar ratio in the range of from 1:0.5 to 1:2.

* * * * *